United States Patent [19]
Ushimaru

[11] Patent Number: 5,321,908
[45] Date of Patent: Jun. 21, 1994

[54] PLANT CULTURE RECEPTACLE

[76] Inventor: Chuji Ushimaru, 3-6-14, Kamisaginomiya, Nakano-ku, Tokyo, Japan, 165

[21] Appl. No.: 60,512

[22] Filed: May 12, 1993

Related U.S. Application Data

[63] Continuation of Ser. No. 878,913, May 6, 1992.

[30] Foreign Application Priority Data

Nov. 1, 1991 [JP] Japan .................................. 3-313499

[51] Int. Cl.⁵ .................................................. A01G 9/14
[52] U.S. Cl. .................................................. 47/69
[58] Field of Search ................................ 47/69, 66, 27

[56] References Cited

U.S. PATENT DOCUMENTS

| | | | |
|---|---|---|---|
| 632,321 | 9/1899 | Olney | 47/69 |
| 865,965 | 9/1907 | Earp-Thomas | 47/69 |
| 926,574 | 6/1909 | Kift | 47/69 |
| 1,427,180 | 8/1922 | Welch | 47/69 |
| 2,807,901 | 10/1957 | Gilowitz | 47/69 |
| 2,950,567 | 8/1960 | Newman | 47/69 |
| 3,269,578 | 8/1966 | Lewis | 47/69 |
| 4,979,332 | 12/1990 | Nagaya et al. | 47/69 |
| 5,094,033 | 3/1992 | Drew | 47/69 |
| 5,136,805 | 8/1992 | Mookherjee | 47/69 |

FOREIGN PATENT DOCUMENTS 471720 of 1969 Switzerland ............................. 47/69

Primary Examiner—Ramon S. Britts
Assistant Examiner—Joanne C. Downs
Attorney, Agent, or Firm—Wegner, Cantor, Mueller & Player

[57] ABSTRACT

A plant is cultivated in a nearly sealed transparent receptacle, which comprises air holes through the well thereof and a culture medium at the bottom. Inside of the receptacle is kept such it is humid and suitable atmosphere for cultivating plants, so that a plant is cultivated without much human labor. The plant culture receptacle according to the present invention is effective for decorating and cultivating plants.

7 Claims, 3 Drawing Sheets

PLANT CULTURE RECEPTACLE

This application is a continuation of U.S. application Ser. No. 07/878,913 filed May 6, 1992.

DESCRIPTION OF THE PRIOR ARTS

Generally, decoration plants such as cut flowers and cut branches are put in a base with water filled therein. And, plants such as the one with a root or bonsai (a potted dwarf tree) are put in a flowerpot with soil filled therein.

The disadvantage of the cut flowers and cut branches described above is that they do not last long and their lives are considerably short. The disadvantage of the plant with a root and bonsai is such that it is necessary to supply water to them so often that they require a lot of human labor.

The object of the present invention therefore is to provide a plant culture receptacle which enables to cultivate plants with a root or without a root for a long time without much human labor.

DETAILED DESCRIPTION OF THE PRESENT INVENTION

Figure 1:
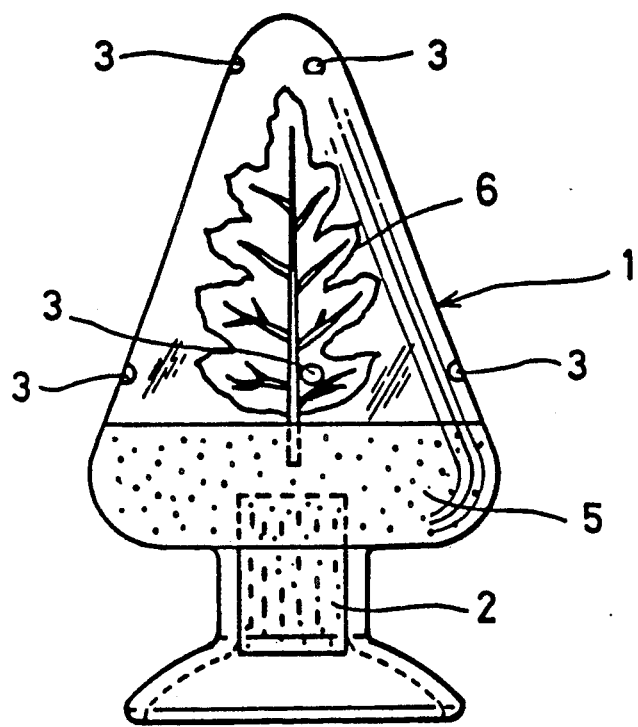
FIG. 1 shows an elevational view of a preferred embodiment of the present invention.

A plant culture receptacle according to the present invention comprises a main body 1 of the receptacle and a plug 2. The main body 1 is transparent and it is nearly sealed, comprising air holes 3 through the wall thereof and an opening 4. The main body 1 is provided with a culture medium 5 at the bottom thereof, and a plant 6, the bottom portion thereof being put into the culture medium 5. The plug 2 seals the opening 4 of the main body 1.

It is advantageous to comprise air holes 3 at the upper portion and the lower portion of the transparent main body 1. It is also advantageous to have an opening 4 at the bottom portion of the main body 1. The plug 2 can be provided with a concave 11 (FIG. 5), and natural soil can be put in the concave 11 as a culture medium 5. Water 7 may be filled over the culture medium 5 at the bottom of the main body. Further, the plug 2 may be provided with vertical hollows 9 (FIG. 6) to put water 7, plant 6 and perfumes 8 in each of the vertical hollow 9. A tube-like container 10 may be inserted into each vertical hollow 9. The plug is preferably made of cork board or material.

Culture medium 5 and a plant 6 are placed in the main body 1 through the opening 4. After the placement, the opening 4 is sealed with the plug 2. Thereafter, water 7 is supplied into the main body 1 through the air holes 3. Then, the plant 6 in the main body 1 lives for a long time, scarcely requiring a supply of new water and human care. That is, the inside of the main body 1 is communicated to the outside only by the narrow air holes 3, so that moisture of the culture medium 5 hardly evaporate, and the inside of the main body 1 is kept highly humid for a long period of time which is a suitable atmosphere for cultivating a plant 6, and that bacterias are nearly kept out. Therefore, water may be supplied to the culture medium 5 only once in several weeks. In general, plants are well cultivated when water is supplied not only through their roots but also through their leaves and branches. In such sense, according to the present invention, the main body 1 is kept highly humid, so that water(moisture) is naturally and constantly supplied to leaves and branches of a plant 6, which is a desirable atmosphere for cultivating a plant. Further, since leaves and branches of a plant 6 are well supplied with water, the plant 6 is rightly wet and exhibits its bright and charming color.

A plant culture receptacle according to the present invention, the main body 1 thereof is arranged to be transparent, so that a plant 6 cultivated in the main body 1 can be clearly appreciated both in an indoor and an outdoor just like other regular plants. The main body 1 is provided with air holes 3, so that air flows in the main body 1, which prevents the transparent main body 1 from being dimmed. Therefore, the plant 6 inside the main body 1 can be vividly appreciated as it is.

By providing a number of air holes 3 at the upper and lower portions of the main body 1, the air flows more smoothly, so that the plant 6 inside the main body 1 can be enjoyed in a better condition. With a plant culture receptacle having air holes 3 as described above, water can be supplied to the culture medium with a syringe through an air hole 3 at the lower portion of the main body 1. By filling some water 7 over the culture medium 5, it is unnecessary to supply water for several months to a few years.

According to the present invention, a plant 6 is put in a nearly air-tightly sealed receptacle, main body 1, so that even a plant having a root is prevented from normal growth, which obviates human care such as trimming of the leaves and branches. The fact that the plant scarcely grows in the nearly sealed receptacle seems to be derived from the instinct plants normally have. That is, plant 6 instinctively feels that it is put in a nearly sealed receptacle, the main body 1, and it saves its growth by itself to live in the limited space.

By providing a concavity 11 (FIG. 5) to a plug 2 and providing a culture medium 5 in the concavity 11, a plant 6 is put in the plug 2 in advance, then the plant 6 and the plug 2, as a unit, can be attached to the main body 1, which makes the work of putting the plant 6 in the main body 1 easire.

A plant culture receptacle according to the present invention, the plug 2 may be provided with a vertical hollow 9, (FIG. 6) and water 7 and a plant 6 may be put in the vertical hollow 9, which obviates a culture medium 5. Further, the plug 2 may be provided with a plural number of vertical hollows 9, and, for example, by putting a cut flower and water 7 in one vertical hollow 9 and perfumes 8 suitable for the cut flower in another vertical hollow 9, the smell of the perfumes 8 flows out through the air holes 3, so that not only the outlook of the plant 6 can be enjoyed but also the sweet-smell thereof can be enjoyed. By placing a tube-like container in each vertical hollow 9, water leak is completely prevented.

A plug 2 may be made of cork material. The cork moderately absorbs the water of the culture medium 5 and it contains air inside thereof, so that a root of a plant 6 can be prevented from being spoiled. A cork turns out to be white in its color when it dries, so that by checking the color of the cork, water can be supplied to the culture medium 5, which makes the maintenance easier.

PREFERRED EMBODIMENT OF THE PRESENT INVENTION

Figure 2:
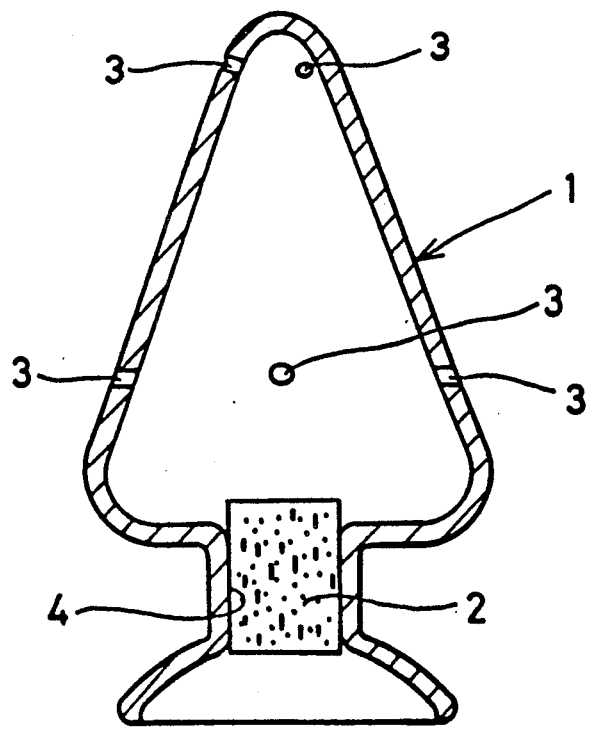
FIG. 2 shows a sectional view of the preferred embodiment shown in FIG. 1.
Figure 3:
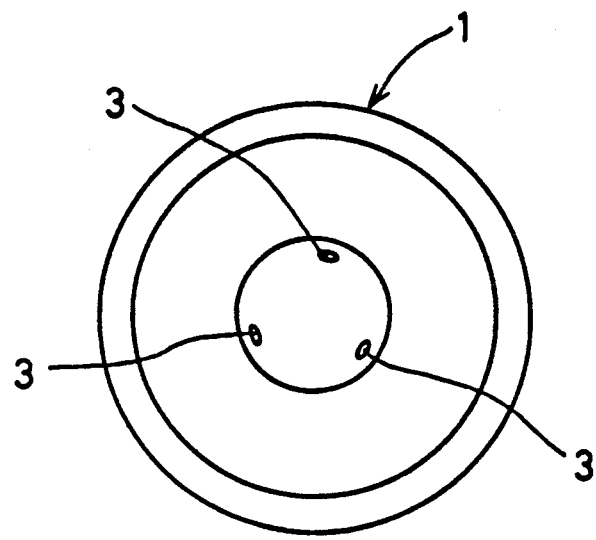
FIG. 3 shows a top view of the preferred embodiment of the present invention shown in FIG. 1 and FIG. 2.

FIGS. 1, 2 and 3 show a preferred embodiment of the present invention.

The sectional view of the preferred embodiment shaped like a spade. It comprises a main body 1 and a plug 2. The main body 1 is provided with three air holes 3 at the upper portion thereof and four air holes 3 at the lower portion thereof. It is also provided with a culture medium 5 composed of natural soil at the bottom thereof, and a pine tree with a root is put in the culture medium 5. The plug 2 is made of cork.

Since the main body 1 comprises air holes 3 both at the upper and the lower portion thereof, the air in the main body 1 flows smoothly and the inside wall of the main body 1 does not dim. Water can be supplied in the main body 1 through the air holes 3 at the lower portion thereof. In general, it is necessary to give water to a pine tree in a flowerpot every day. However, according to the plant culture receptacle of the present invention, water should be supplied only once several days, which eliminates daily human care.

The main body 1 is made of glass. The transparency of glass is superb, so that it is effective to be used as a decoration receptacle containing a plant therein. Reinforced glass and heat-resistant reinforced glass are suitable materials of the main body 1, as they are resistable against a shock. The main body 1 according to the present invention is preferably made of glass, but it may be made of other materials such as a plastic.

The plug 2 in the preferred embodiment is made of cork. Cork naturally has eminent absorption and elasticity, so that it is easily attached to and removed from the main body 1, and that it is suitable as a plug 2. However, the plug 2 according to the present invention is not limited to the cork, and it can be composed of such materials as rubber and glass. According to the preferred embodiment, the culture medium 5 is composed of natural soil, although, it can be made of other materials such as rockwool.

Figure 4:
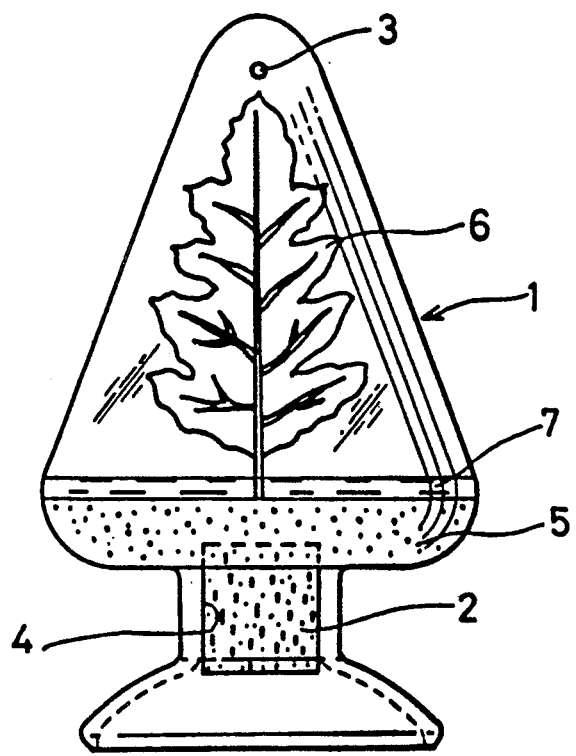
FIG. 4 shows an elevational view of another preferred embodiment of the present invention.

FIG. 4 shows another preferred embodiment of the present invention.

This discloses an art that a cut branch is stood on a culture medium 5, and some water 7 is provided on the culture medium 5. Generally, a cut branch having no roots dies in a couple of weeks even if it is put in a flower vase with water filled therein. A plant culture receptacle according to the present invention, on the other hand, enables such plant to live at least a few months, and depending on plants, it makes some of them let their roots begin to grow. Such plants live much longer. When a cut flower is placed in a plant culture receptacle according to the present invention, it is understood that such cut flower lives a few times longer than the one put in a flower vase, according to an experiment. In general, an orchid, for example, requires a lot of human care when it is cultivated. However, with a plant culture receptacle according to the present invention, such orchid grows smoothly scarcely requiring human care.

According to this preferred embodiment, air holes 3 are provided only in the upper portion of the main body 1, although, air holes 3 may be provided at the lower portion thereof (slightly above the upper level of the water 7), so that air smoothly flows in the main body 1, and the inside wall thereof will be effectively prevented from being dimmed.

Figure 5:
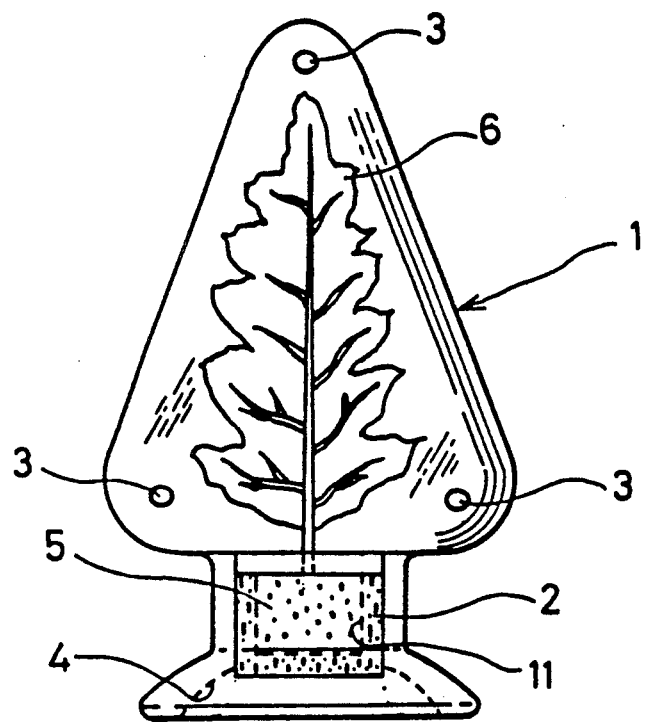
FIG. 5 shows an elevational view of another preferred embodiment of the present invention.

FIG. 5 shows another preferred embodiment of the present invention.

The characteristic of this plant culture receptacle is that the plug 2 thereof comprises a concavity 11, and natural soil is put in the concavity 11, providing a culture medium 5. With such construction, a plant 6 can be stood on the culture medium 5 of the plug 2 in advance, and a unit of the plant 6 and the plug 2 can be attached to the main body 1 at once, so that putting a plant 6 in a main body 1 can be performed easily.

Figure 6:
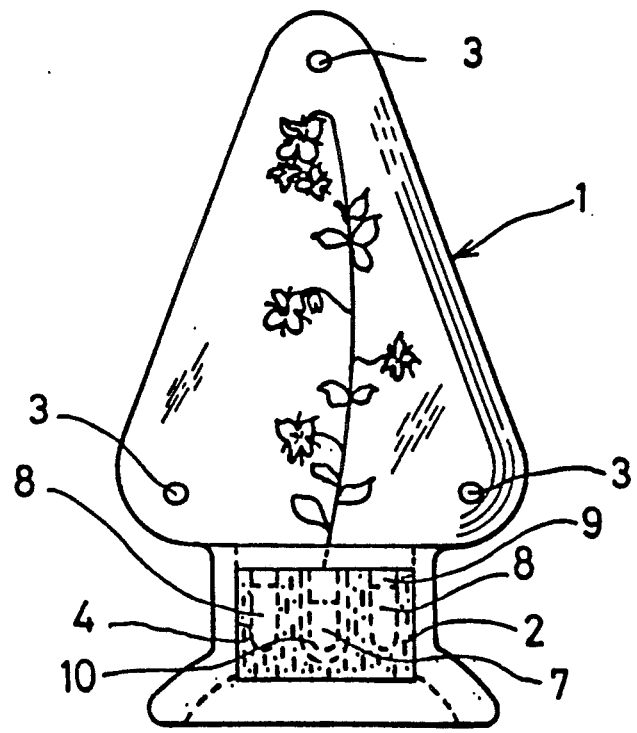
FIG. 6 shows an elevational view of another preferred embodiment of the present invention.

FIG. 6 shows another preferred embodiment of the present invention.

According to this embodiment, the plug 2 comprises a plural number of vertical hollows 9, and a tube-like container 10 is placed in each of the vertical hollows 9. A cut flower, an orchid, and water 7 are put in the vertical hollow 9 located in the center, and perfumes 8 of an orchid are put in the rest of the vertical hollows 9. By arranging so, not only the beauty of the orchid but also the scent thereof can be enjoyed. In this preferred embodiment, tube-like containers 10 are utilized. However, according to the present invention, the tube-like containers 10 can be removed, and water 7, plant 6 and perfumes 8 can be put directly into the vertical hollows 9.

The main body 1 in the preferred embodiment shaped like a spade, however, a plant culture receptacle according to the present invention is not limited to such shape, and it may shape any type such as a globe, a column, a square pillar and a polygon. That is, a main body 1 according to the present invention may be any shape of nearly sealed container which comprises at least air holes 3 and an opening 4.

Further, according to the present invention, a whole portion of the main body 1 is not necessarily transparent, but at least a portion through which a plant 6 can be seen should be transparent.

According to the preferred embodiment disclosed above, the opening 4 is formed at the bottom of the main body 1, however, the present invention does not limit the opening 4 to be formed at the bottom. The opening 4 may be provided to the top or side portion of the main body 1. The air holes 3 may also be formed at any portion of the main body 1, instead of the upper and lower portions of the main body 1.

A plant culture receptacle according to the present invention, is such that a plant 6 is cultivated in a nearly sealed transparent receptacle having air holes 3, so that human care such as water supply and trimming can be avoided, and that the plant 6 can live for a long time, which are extremely effective for appreciation and cultivation of plants.

I claim:
1. A plant culture receptacle comprising:
a main body having a wall and being substantially uniformly transparent at least in any portion of said body through which a plant inside said body is viewable;
a supporting base integral with said wall; and having an underside thereof an access passage to said main body through a bottom portion of the underside of said base and through which said plant and a culture medium are insertable into said main body;

a removable plug sealing said access passage;

said culture medium and plant being situated in a bottom of said main body and retained therein by said plug, when said receptacle is in a normal-use position; and means for retaining sufficient humidity within said main body for plant growth therein and for providing for circulating of air through said main body which is sufficient for preventing said humidity inside said main body from dimming a view of said plant through said wall, said humidity retaining and dimming preventing means comprising air holes through upper and lower halves of said wall, said air holes being sized sufficiently small for said humidity retaining and sufficiently large and vertically spaced apart for said circulating of air and dimming preventing.

2. A plant culture receptacle as in claim 1, wherein said plug comprises:

a concavity into which said culture medium and plant are receivable prior to insertion of said plug into said base such that said plant and culture medium are inserted into said receptacle, through said access passage of said bottom portion of said base the underside of, during mounting and sealing of said plug therein.

3. A plant culture receptacle as in claim 1, and further comprising:

means for retaining water within said receptacle such that said culture medium is immersed in water.

4. A plant culture receptacle as in claim 1, wherein said plug comprises:

at least one vertically disposed hollow for receiving at least one element of the set of water, plant and perfume.

5. A plant culture receptacle as in claim 4, and further comprising:

at least one tube-like container fitting within said hollow of said plug.

6. A plant culture receptacle as in claim 1, wherein said plug comprises:

a cork material.

7. A plant culture receptacle as in claim 1, wherein said base, which is integral with said body, comprises:

a tubular pedestal portion and a tubular column portion extending between said body and said tubular pedestal portion and being smaller in outer diameter than said body and said tubular pedestal portion, said tubular pedestal and tubular column portions providing said access passage to said main body through said bottom portion of the underside of said base.

* * * * *